(12) United States Patent
Lee

(10) Patent No.: US 8,478,271 B1
(45) Date of Patent: Jul. 2, 2013

(54) COMMUNICATIONS APPARATUS AND METHOD FOR DISPERSING TRAFFIC

(75) Inventor: Chang Ju Lee, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/404,776

(22) Filed: Feb. 24, 2012

(30) Foreign Application Priority Data

Dec. 22, 2011 (KR) .......................... 10-2011-0139995

(51) Int. Cl.
*H04W 4/00* (2009.01)
(52) U.S. Cl.
USPC .................. 455/435.2; 455/414.4; 455/452.1
(58) Field of Classification Search
USPC .......... 455/414.1–414.4, 422.1, 435.1–435.3, 455/445, 448, 452.1–452.2; 370/335–338, 370/342–343, 345
See application file for complete search history.

(56) References Cited

U.S. PATENT DOCUMENTS

| | | | | |
|---|---|---|---|---|
| 7,403,508 | B1* | 7/2008 | Miao | ............................. 370/335 |
| 2002/0197998 | A1* | 12/2002 | Schmidt | ........................ 455/452 |
| 2007/0076696 | A1* | 4/2007 | An et al. | ....................... 370/352 |
| 2012/0196579 | A1* | 8/2012 | Souissi et al. | .............. 455/414.4 |
| 2012/0331111 | A1* | 12/2012 | Wu et al. | ....................... 709/219 |

FOREIGN PATENT DOCUMENTS

| | | |
|---|---|---|
| KR | 10-2006-0093216 | 8/2006 |
| WO | WO 2006/088340 A1 | 8/2006 |

OTHER PUBLICATIONS

QoS Aware Wireless Bandwidth Aggregation (QAWBA) by Integrating Cellular and Ad-hoc Networks. Danyu Zhu, Matt W. Mutka, and Zhiwei Cen. 2004.*

* cited by examiner

*Primary Examiner* — Kashif Siddiqui
(74) *Attorney, Agent, or Firm* — McDermott Will & Emery LLP

(57) ABSTRACT

A communications apparatus includes a cellular communication unit performing pre-set cellular communication, a Wi-Fi communication unit performing pre-set Wi-Fi communication, and a controller checking an available data rate of an available cellular network and that of a Wi-Fi network to determine a data division ratio by using the cellular communication unit and the Wi-Fi communication unit, obtaining an IP address pair, and transferring data including connection request information, the data division ratio for traffic dispersion, and the IP address pair to the server, according to a connection request from the server.

16 Claims, 8 Drawing Sheets

COMMUNICATIONS APPARATUS AND METHOD FOR DISPERSING TRAFFIC

CROSS-REFERENCE TO RELATED APPLICATIONS

This application claims the priority of Korean Patent Application No. 10-2011-139995 filed on Dec. 22, 2011, in the Korean Intellectual Property Office, the disclosure of which is incorporated herein by reference.

BACKGROUND OF THE INVENTION

1. Field of the Invention

The present invention relates to a communications apparatus and method applicable to a cellular terminal such as a mobile phone, or the like, able to effectively disperse traffic by using both a cellular network and a Wi-Fi network, both of which are heterogeneous networks.

2. Description of the Related Art

In general, cellular communications schemes are classified into a first-generation communications scheme, a second-generation communications scheme, a third-generation communications scheme, and a fourth-generation communications scheme. Among them, the third-generation communications scheme, commonly used recently, is divided into an asynchronous scheme represented by wideband code division multiple access (WCDMA) and a synchronous scheme represented by code division multiple access (CDMA). The fourth-generation scheme is represented by long-term evolution (LTE), worldwide interoperability for microwave access (WiMax), and the like.

The cellular communication method is advantageous in that it allows for seamless data communications while on the move, but disadvantageous in that a user fee is incurred and network traffic increases, due to the use of limited radio resources.

Due to the shortcomings of cellular communication, Wi-Fi communication, which does not incur a charge and supports a high data transfer rate, may be used. Wi-Fi communication, a wireless technology advanced from the existing wired network, is advantageous in that a high data rate may be implemented therewith, and it can be used free of charge. However, it has shortcomings in that a region that can be covered by a base station may be excessively narrow and it is difficult to use Wi-Fi communication while on the move.

Recently, cellular phones support both cellular communication and Wi-Fi communication, whereby each cellular phone may use cellular communication while on the move and Wi-Fi communication while in a fixed location. Also, in order to implement mobility, a communications scheme of converting a cellular communication scheme into a Wi-Fi communication scheme may be used.

However, related art communications terminals such as cellular phones, or the like, may use either cellular communication or Wi-Fi communication, but cannot use both for dispersing traffic, so an increase in traffic in a communications network in use is unavoidable.

Patent document 1 described in the following prior art document relates to a handoff method between a mobile communications network and a WLAN, and an apparatus thereof. This document does not disclose the simultaneous use of cellular communication and Wi-Fi communication to disperse traffic.

(Patent document 1) Korean Patent Laid Open Publication No. 10-2006-0093216

SUMMARY OF THE INVENTION

An aspect of the present invention provides a communications apparatus and method for dispersing (or distributing) traffic, applicable to a cellular terminal such as a mobile phone, and the like, able to effectively disperse traffic by using both a cellular network and a Wi-Fi network, both of which are heterogeneous networks.

According to an aspect of the present invention, there is provided a communications apparatus including: a cellular communication unit performing pre-set cellular communication; a Wi-Fi communication unit performing pre-set Wi-Fi communication; and a controller checking an available data rate of an available cellular network and that of a Wi-Fi network to determine a data division ratio by using the cellular communication unit and the Wi-Fi communication unit, obtaining an IP address pair, and transferring data including connection request information, the data division ratio for traffic dispersion, and the IP address pair to the server, according to a connection request from the server.

The cellular communication unit may include: a cellular data processing unit converting data to be transmitted into a signal in conformity with a pre-set cellular communication protocol and converting a received signal into data in conformity with a pre-set cellular communication protocol; and a cellular transceiver unit converting a signal from the cellular data processing unit into a pre-set ratio signal and providing the converted radio signal to a first antenna, and converting a radio signal from the first antenna into a pre-set signal and providing the converted signal to the cellular data processing unit.

The Wi-Fi communication unit may include: a Wi-Fi data processing unit converting data to be transmitted into a signal in conformity with a pre-set cellular communication protocol, and converting a received signal into data in conformity with a pre-set cellular communication protocol; and a Wi-Fi transceiver unit converting a signal from the Wi-Fi data processing unit into a pre-set radio signal and providing the converted radio signal to a second antenna, and converting a radio signal from the second antenna into a pre-set signal and providing the converted signal to the Wi-Fi data processing unit.

The controller may check an available cellular network and a Wi-Fi network by using the cellular communication unit and Wi-Fi communication unit according to the connection request from the server.

The controller may check a state and an available data rate of the checked cellular network and that of the Wi-Fi network.

The controller may obtain an IP address of each of the available cellular network and the Wi-Fi network, and form an IP address pair for traffic dispersion.

The controller may determine a data division ratio according to the available data rates of the available cellular network and the Wi-Fi network.

The controller may perform data communications with the server according to the data division ratio by using the cellular network and the Wi-Fi network corresponding to the previously registered IP address pair.

The controller may check data rates of respective networks and adjust a division ratio according to the checked data rates during data communications using the cellular network and the Wi-Fi network.

The controller may continuously check whether or not a block network is available again in case in which when a network is blocked during data communications using the cellular network and the Wi-Fi network, and when it is determined that the block network is available, the controller may adjust the division ratio according to a data rate of the checked network.

According to another aspect of the present invention, there is provided a communication method including: checking, by a controller in cooperation with a cellular communication unit and a Wi-Fi communication unit of a communication apparatus, an available cellular network and an available Wi-Fi network according to a connection request from a server; checking an available data rate of the checked cellular network and that of the Wi-Fi network; determining a data division ratio according to the available data rates, obtaining an IP address of each of the available cellular network and the Wi-Fi network, and forming an IP address pair; and transferring data, the data division ratio for traffic dispersion, and the IP address pair to the server.

The method may further include: performing data communications with the server according to the data division ratio by using the cellular network and the Wi-Fi network corresponding to the previously registered IP address pair.

In the performing of data communications, a state of each network may be monitored and the division ratio may be adjusted during data communications using the cellular network and the Wi-Fi network.

In the checking of an available data rate, the state of the checked cellular network and the Wi-Fi network may be further checked.

The performing of data communications may include: performing data transmission and reception using the cellular network and the Wi-Fi network; transmitting and receiving an ACK signal and a NACK signal generated during the data transmission and reception; adjusting a data division ratio according to the ACK signal and the NACK signal; determining whether or not a network has been blocked based on the ACK signal and the NACK signal; determining whether to select communication termination when a network has not been blocked, returning to the data transmission and reception operation when communications termination is not selected, and terminating the communication when the communication termination is selected; and periodically checking a blocked network when the network has been blocked.

The periodically checking a network may include: periodically checking whether or not the blocked network is available again when it is determined that the network has been blocked in the network blocking determination operation; and returning to the data division ratio adjustment operation when it is determined that the network is available again.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
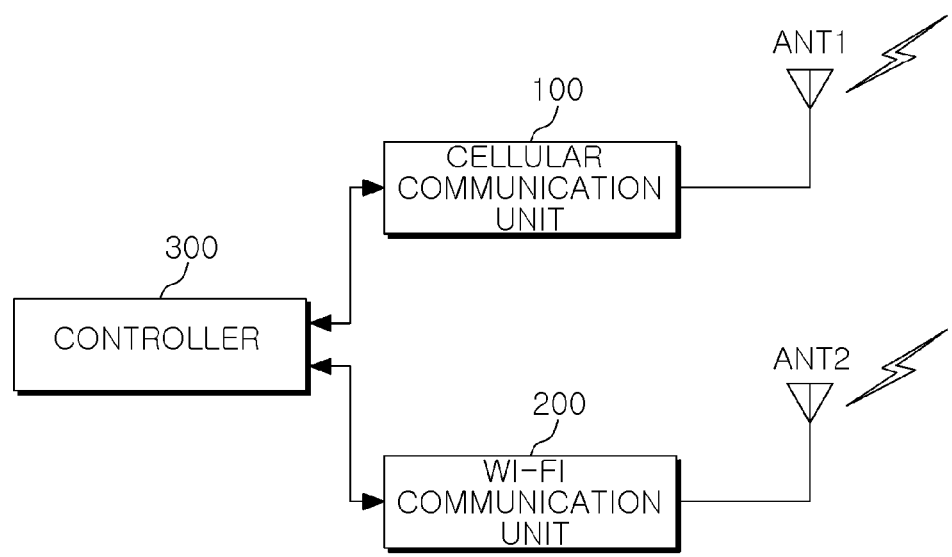
FIG. 1 is a schematic block diagram of a communications apparatus according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a schematic block diagram of a communications apparatus according to an embodiment of the present invention.

With reference to FIG. 1, a communications apparatus according to an embodiment of the present invention may include a cellular communication unit 100 performing pre-set cellular communication, a Wi-Fi communication unit 200 performing pre-set Wi-Fi communication, and a controller checking (or ascertaining or confirming) an available data rate of an available cellular network and that of a Wi-Fi network to determine a data division ratio by using the cellular communication unit 100 and the Wi-Fi communication unit 200, obtaining an IP address pair, and transferring data including connection request information, the data division ratio for traffic dispersion, and the IP address pair to a server, according to a connection request from the server.

In this case, according to the server connection request that may be generated according to a user selection, the controller 300 may check an available data rate of an available cellular network and that of an available Wi-Fi network to determine a data division ratio by using the cellular communication unit 100 and the Wi-Fi communication unit 200.

Also, the controller 300 may obtain the IP address pair and transfer the data including the connection request information, the data division ratio for traffic dispersion, and the IP address pair to the server by using the cellular communication unit 100.

Here, upon receiving the data including the connection request information, the data division ratio for traffic dispersion, and the IP address pair from the communication apparatus, the server may register the data division ratio and the IP address pair. Thereafter, according to a data request from the communication apparatus, the server may divide data according to the registered IP address pair and the data division ratio and provide the same.

The cellular communication unit 100 may perform pre-set cellular communication. Here, the cellular communication may employ a present communication scheme, for example, a third-generation scheme such as WCDM, CDMA, or the like, or a fourth-generation scheme such as LTE, WiMax, or the like.

The Wi-Fi communication unit 200 may perform pre-set Wi-Fi communication. Here, Wi-Fi communication may employ at least one of IEEE 802.11, IEEE 802.11a, IEEE 802.11b, IEEE 802.11g, and IEEE 802.11n included in wireless LAN standards developed by a working group of IEEE.

Figure 2:
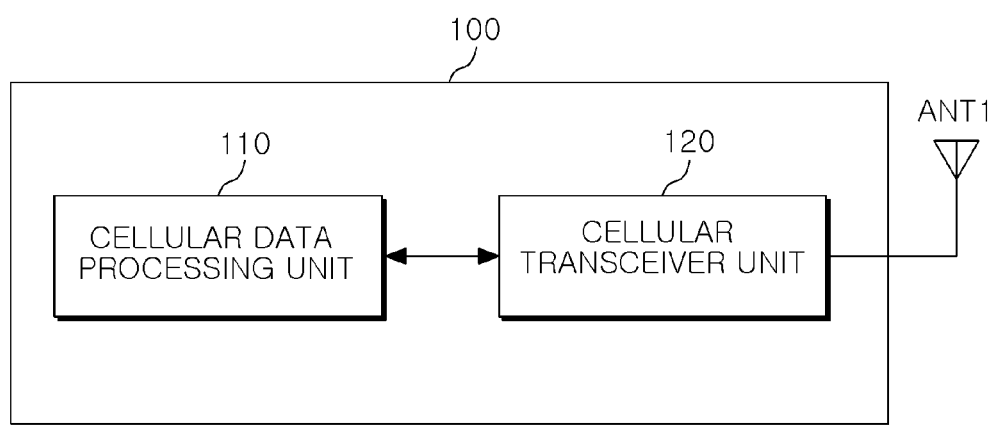
FIG. 2 is a view showing an internal configuration of a cellular communication unit according to an embodiment of the present invention.

FIG. 2 is a view showing an internal configuration of the cellular communication unit according to an embodiment of the present invention.

With reference to FIG. 2, the cellular communication unit may include a cellular data processing unit 110 converting data to be transmitted into a signal in conformity with a pre-set cellular communication protocol and converting a received signal into data in conformity with a pre-set cellular communication protocol, and a cellular transceiver unit 120 converting a signal from the cellular data processing unit 110 into a pre-set ratio signal and providing the converted radio signal to a first antenna ANT1, and converting a radio signal from the first antenna ANT1 into a pre-set signal and providing the converted signal to the cellular data processing unit 110.

Here, referring to a transmission (Tx) process of the cellular communication unit 100, the cellular data processing unit 110 may convert data to be transmitted from the controller 300 into a signal in conformity with a pre-set cellular communication protocol and provide the converted signal to the cellular transceiver unit 120. Here, the data to be transmitted may include the connection request information and information regarding the data division ratio for traffic dispersion and the IP address pair.

The cellular transceiver unit 120 may convert the signal from the cellular data processing unit 110 into a pre-set radio signal, and provide the converted radio signal to the first antenna ANT1.

Also, referring to a reception (Rx) process of the cellular communication unit 100, the cellular transceiver unit 120 may convert the radio signal from the first antenna ANT1 into a pre-set signal, and provide the converted signal to the cellular data processing unit 110.

The cellular data processing unit 110 may convert the signal from the cellular transceiver unit 120 into data in conformity with a pre-set cellular communication protocol and provide the converted data into the controller 300. Here, the received data may include information provided from the server, an ACK (ACKnowledgement)) signal, or a NACK (Negative-ACKnowledgement) signal.

Figure 3:
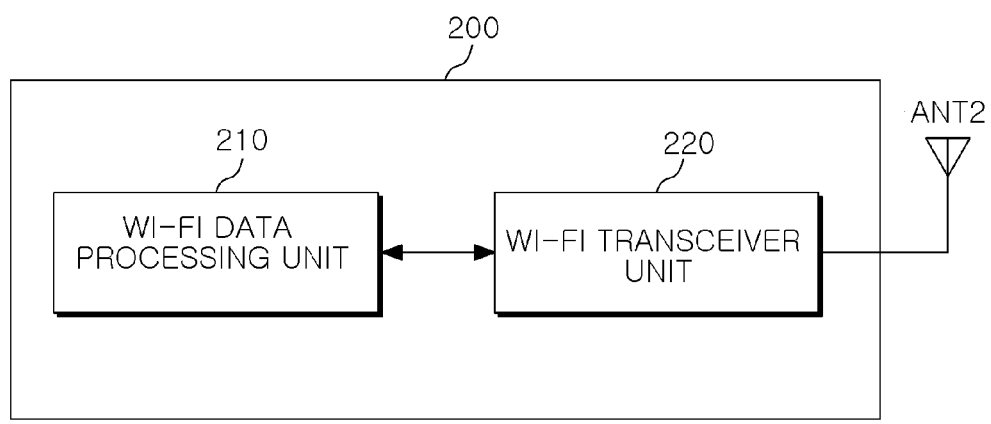
FIG. 3 is a view showing an internal configuration of a Wi-Fi communication unit according to an embodiment of the present invention.

FIG. 3 is a view showing an internal configuration of the Wi-Fi communication unit according to an embodiment of the present invention.

With reference to FIG. 3, the Wi-Fi communication unit 200 may include a Wi-Fi data processing unit 210 converting data to be transmitted into a signal in conformity with a pre-set cellular communication protocol, and converting a received signal into data in conformity with a pre-set cellular communication protocol, and a Wi-Fi transceiver unit 220 converting a signal from the Wi-Fi data processing unit 210 into a pre-set radio signal and providing the converted radio signal to a second antenna ANT2, and converting a radio signal from the second antenna ANT2 into a pre-set signal and providing the converted signal to the Wi-Fi data processing unit 110.

Here, referring to a transmission (Tx) process of the Wi-Fi communication unit 200, the Wi-Fi data processing unit 210 may convert data to be transmitted into a signal in conformity with a pre-set cellular communication protocol and provide the converted signal to the Wi-Fi transceiver unit 220. Here, the data to be transmitted may include the connection request information and information regarding the data division ratio for traffic dispersion and the IP address pair.

The Wi-Fi transceiver unit 220 may convert a signal from the Wi-Fi data processing unit 210 into a pre-set radio signal and provide the converted radio signal to the second antenna ANT2.

Also, referring to a reception (Rx) process of the Wi-Fi communication unit 200, the Wi-Fi transceiver unit 220 may convert the radio signal from the second antenna ANT2 into a pre-set signal, and provide the converted signal to the Wi-Fi data processing unit 110.

The Wi-Fi data processing unit 210 may convert a signal from the Wi-Fi transceiver unit 220 into data in conformity with a pre-set cellular communication protocol and provide the converted data to the controller 300. Here, the received data may include information provided from the server, an ACK signal indicating that a signal has been normally received and a NACK signal indicating that a signal has not been normally received.

In detail, with reference to FIGS. 1 through 3, according to a connection request from the server, the controller 300 may check an available cellular network and an available Wi-Fi network by using the cellular communication unit 100 and the Wi-Fi communication unit 200.

Here, when cellular communication is performed through the cellular communication unit 100, the controller 300 may be able to check an available cellular network based on a signal received via the cellular communication unit 100. Here, based on the signal received via the cellular communication unit 100, the controller 300 may know (recognize) a name of a corresponding network, and an address and a data rate of the corresponding network, and the like.

Also, when Wi-Fi communication is performed through the Wi-Fi communication unit 200, the controller 300 may be able to check an available Wi-Fi network based on a signal received via the Wi-Fi communication unit 200. Here, based on the signal received via the Wi-Fi communication unit 200, the controller 300 may know (recognize) a name of a corresponding network, and an address and a data rate of the corresponding network, and the like.

Thus, the controller 300 may check a state and an available data rate of the checked cellular network and the Wi-Fi network and obtain an IP address of each of the available cellular network and Wi-Fi network to form an IP address pair for traffic dispersion. Here, the state of the network may be a signal strength, or the like, of the network.

The controller 300 may determine a data division ratio according to an available data rate of the available cellular network and that of the Wi-Fi network.

Here, the data division ratio of the cellular network and the Wi-Fi network may be variably set, based on the available data rates of the available cellular network and the Wi-Fi network.

For example, it is assumed that a data rate of the cellular network is a first data rate and that of the Wi-Fi network is a second data rate. When the first data rate and the second data rate are equal to be 50 Mbps, a data division ratio may be set to 50:50. When the first data rate and the second data rate are 70 Mbps and 30 Mbps, respectively, a data division ratio may be set to 70:30. When the first data rate and the second data rate are 30 Mbps and 70 Mbps, respectively, a data division ratio may be set to 30:70. When the first data rate and the second data rate are 0 Mbps and 50 Mbps, respectively, a data division ratio may be set to 0:100. When the first data rate and the second data rate are 50 Mbps and 0 Mbps, respectively, a data division ratio may be set to 100:0.

The controller 300 may perform data communications with the server according to the data division ratio by using the cellular network and the Wi-Fi network corresponding to the previously registered IP address pair.

Here, when the data division ratio of the cellular network and the Wi-Fi network is 20:80, data may be divided such that 20% of the entire data is used for communication through the cellular network and 80% of the entire data is used for communication through the Wi-Fi network.

Also, the data division ratio may be applied to an up-stream corresponding to a path for transmission from the communications apparatus to the server, and may also be applied to a down-stream corresponding to a path for reception (Rx) from the server to the communication apparatus. In particular, downstream traffic is increased than upstream traffic, so a traffic dispersion effect in the downstream may be preferable.

Also, during data transmission using the cellular network and the Wi-Fi network, the controller 300 may check data rates of respective networks and adjust a division ratio according to the checked data rates.

In detail, during data communications using the cellular network and the Wi-Fi network, if any of the networks is blocked, the controller 300 may keep checking whether the blocked network is available again, and when the blocked network is checked to be available again, the controller 300 may re-adjust the division ratio according to a data rate of the checked network.

Figure 4:
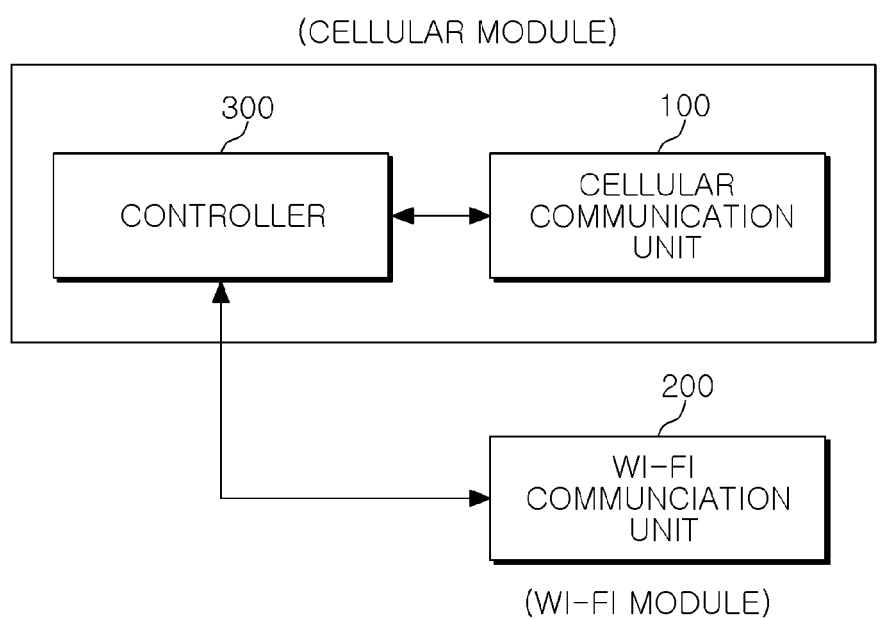
FIG. 4 is a view showing a first implementation example of the communications apparatus according to an embodiment of the present invention.
Figure 5:
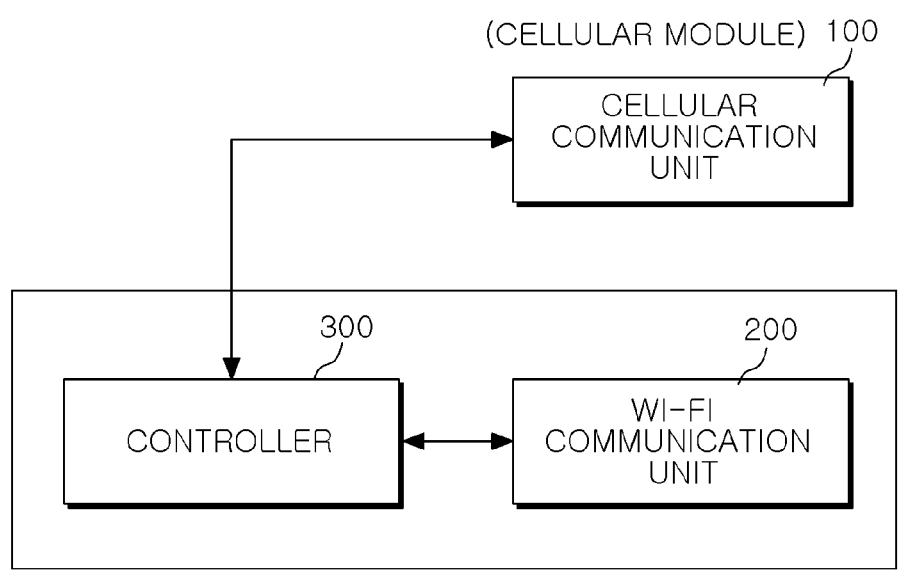
FIG. 5 is a view showing a second implementation example of the communications apparatus according to an embodiment of the present invention.

FIG. 4 is a view showing a first implementation example of the communications apparatus according to an embodiment of the present invention. FIG. 5 is a view showing a second implementation example of the communications apparatus according to an embodiment of the present invention.

The communications apparatus according to an embodiment of the present invention may be a cellular phone such as a smart phone, or the like, and when the communications apparatus is manufactured, the cellular communication unit 100 may be implemented as a cellular module and the Wi-Fi communication unit 200 may be implemented as a Wi-Fi module, respectively, and the cellular communication unit 100 and the Wi-Fi communication unit 200 may be implemented as a single communications device. Here, when the communications apparatus according to an embodiment of the present invention is manufactured as modules, the present invention is not limited to the foregoing example and the communications apparatus may be implemented in various forms.

Also, as shown in FIG. 4, the controller 300 and the cellular communication unit 100 may be implemented as a single cellular module, and as shown in FIG. 5, the controller 300 and the Wi-Fi communication unit 200 may be implemented as a single Wi-Fi module.

Figure 6:
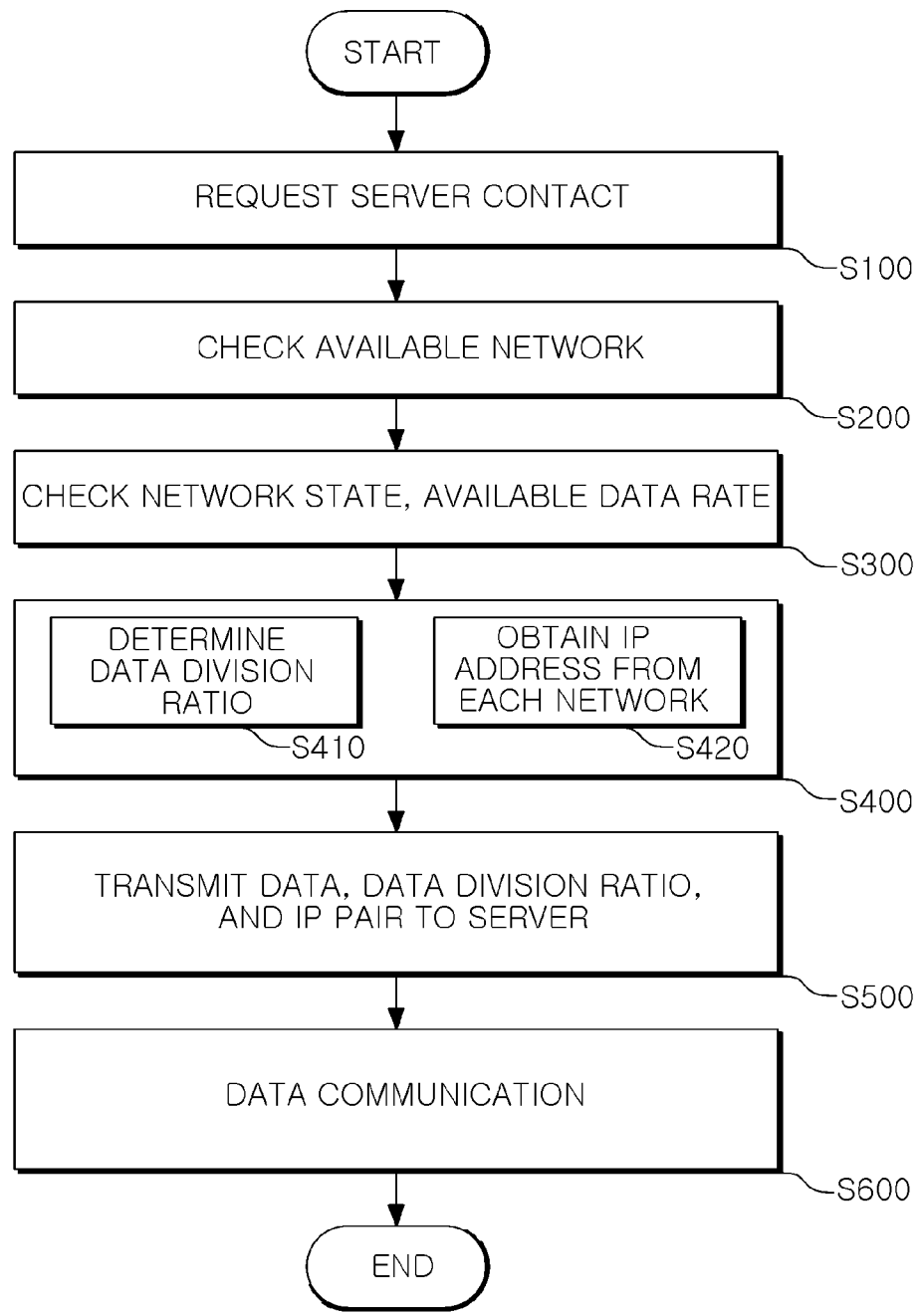
FIG. 6 is a flow chart illustrating a communication method according to another embodiment of the present invention.

FIG. 6 is a flow chart illustrating a communication method according to another embodiment of the present invention.

With reference to FIGS. 1 through 6, the communication method according to another embodiment of the present invention may include steps (S100 and S200) of checking, by the controller 300 in cooperation with the cellular communication unit 100 and the Wi-Fi communication unit 200 of the communication apparatus, an available cellular network and an available Wi-Fi network according to a connection request from a server, step (S300) of checking an available data rate of the checked cellular network and the Wi-Fi network, step (S400) of determining a data division ratio according to the available data rates, obtaining an IP address of each of the available cellular network and the Wi-Fi network, and forming an IP address pair, and step (S500) of transferring data, the data division ratio for traffic dispersion, and the IP address pair to the server.

Also, the communication method may further include step (S600) of performing data communications with the server according to the data division ratio by using the cellular network and the Wi-Fi network corresponding to the previously registered IP address pair.

In this case, first, in steps S100 and S200, according to a server connection request according to a user selection, an available cellular network and Wi-Fi network may be checked by the controller 300 in cooperation with the cellular communication unit 100 and the Wi-Fi communication unit 200 of the communication apparatus.

As described above, when cellular communication is performed via the cellular communication unit 100, an available cellular network may be checked by the controller 300 based on a signal received via the cellular communication unit 100. Here, based on the signal received via the cellular communication unit 100, a name of the corresponding network, an address and a data rate of the corresponding network, and the like, can be known.

Also, when Wi-Fi communication is performed via the Wi-Fi communication unit 200, an available Wi-Fi network may be checked based on a signal received via the Wi-Fi communication unit 200. Here, based on the signal received via the Wi-Fi communication unit 200, a name of the corresponding network, an address and a data rate of the corresponding network, and the like, can be known.

In step S300, available data rates of the checked cellular network and the Wi-Fi network may be checked by the controller 300.

In step S400, a data division ratio may be determined according to the available data rates by the controller 300, and IP addresses of the available cellular network and the Wi-Fi network are obtained to form an IP address pair.

Here, the data division ratio of the cellular network and the Wi-Fi network may be variably set according to the available data rates of the available cellular network and the Wi-Fi network. For example, as mentioned above, the data division ratio may be 50:50, 30:70, 70:30, 0:100, 100:0, and the like.

In step S500, data, the data division ratio, and the IP address pair may be transferred to the server by the controller 300 in cooperation with the cellular communication unit 100 and the Wi-Fi communication unit 200.

In step S600, the controller 300, in cooperation with the cellular communication unit 100 and the Wi-Fi communication unit 200, may perform data communications with the server according to the data division ratio by using the cellular network and the Wi-Fi network corresponding to the previously registered IP address pair.

Here, when the data division ratio of the cellular network and the Wi-Fi network is 20:80, data may be divided such that 20% of the entire data is used for communication through the cellular network and 80% of the entire data is used for communication through the Wi-Fi network.

Also, the data division ratio may be applied to an up-stream corresponding to a path for transmission from the communications apparatus to the server, and may also be applied to a down-stream corresponding to a path for reception (Rx) from the server to the communication apparatus. In particular, downstream traffic is increased more than upstream traffic, so a traffic dispersion effect in the downstream may be better.

Also, in the data communications step (S600), during the data transmission using the cellular network and the Wi-Fi network, a network state may be monitored and the division ratio may be re-adjusted.

In the available data rate checking step (S300), the state of the checked cellular network and the Wi-Fi network may be further checked.

Figure 7:
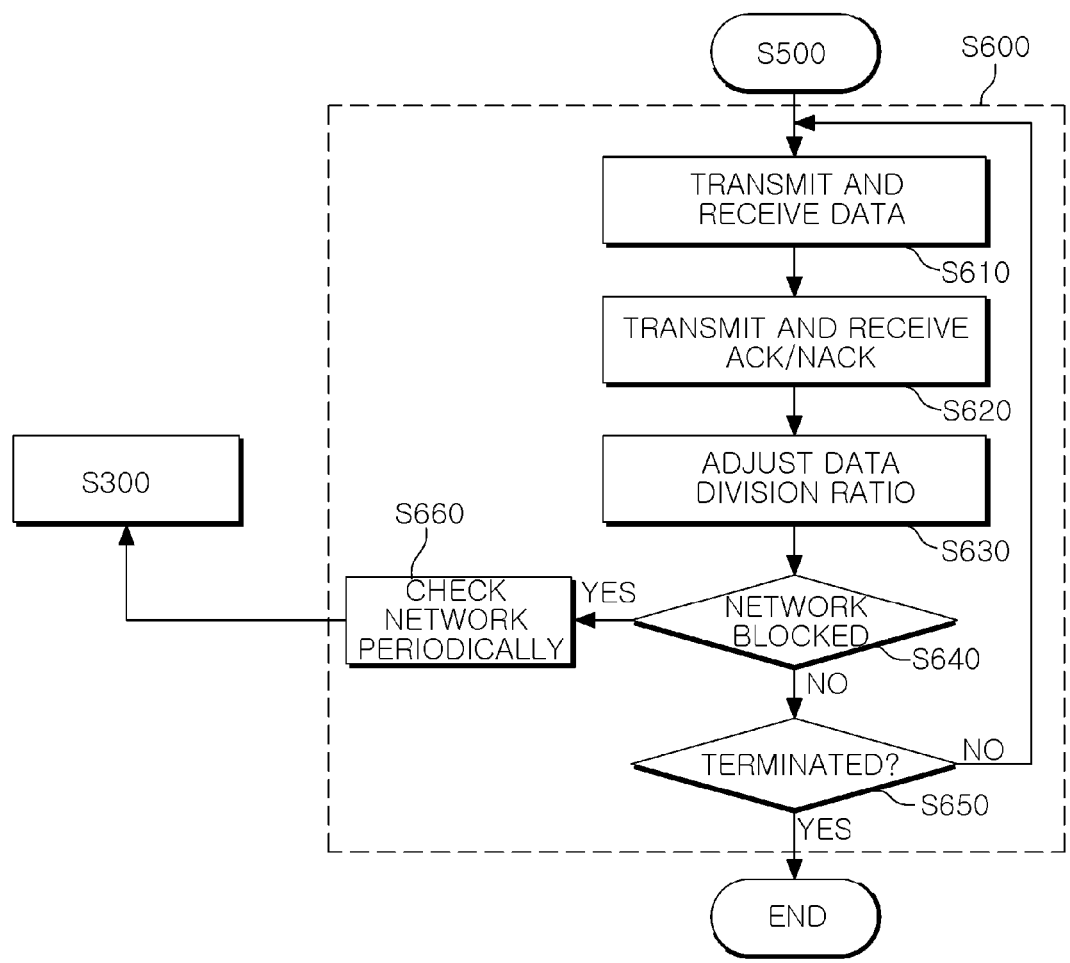
FIG. 7 is a flow chart illustrating a data communications process according to another embodiment of the present invention.

FIG. 7 is a flow chart illustrating a data communications process according to another embodiment of the present invention.

With reference to FIGS. 1 through 7, the data communications step (S600) may include step (S610) of performing data transmission and reception using the cellular network and the Wi-Fi network, step (S620) of transmitting and receiving an ACK signal and a NACK signal generated during the data transmission and reception, step (S630) of adjusting a data division ratio according to the ACK signal and the NACK signal, step (S640) of determining whether or not a network has been blocked based on the ACK signal and the NACK signal, step (S650) of determining whether to select communication termination when a network has not been blocked, returning to the data transmission and reception step (S610) when communications termination is not selected, and terminating the communication when the communication termination is selected, and step (S660) of periodically checking a blocked network when the network has been blocked.

In this case, first, in step (S610), data transmission and reception may be performed by using the cellular network and the Wi-Fi network.

In step S620, an ACK signal and a NACK signal may be transmitted and received during the data transmission and reception. In this case, received signals may include an ACK signal and a NACK signal.

In step S630, a data division ratio may be adjusted according to the ACK signal and the NACK signal (S630). In step S640, whether a network has been blocked may be determined based on the ACK signal and the NACK signal. For example, a communications state can be known in consideration of (or based on) whether or not the ACK signal and the NACK signal have been received, a time required for receiving the ACK signal and the NACK signal, and the like, and a data division ratio may be appropriately adjusted according to the communication state.

In step S650, when a network has not been blocked, whether or not communications termination is selected is determined. When communications termination is not selected, the process is returned to the data transmission and reception step (S610), and when the communication termination is selected, the communication may be terminated.

When it is determined that the network has been blocked in the network blocking determination step S640, whether or not the blocked network is available is periodically checked in step S660.

Figure 8:
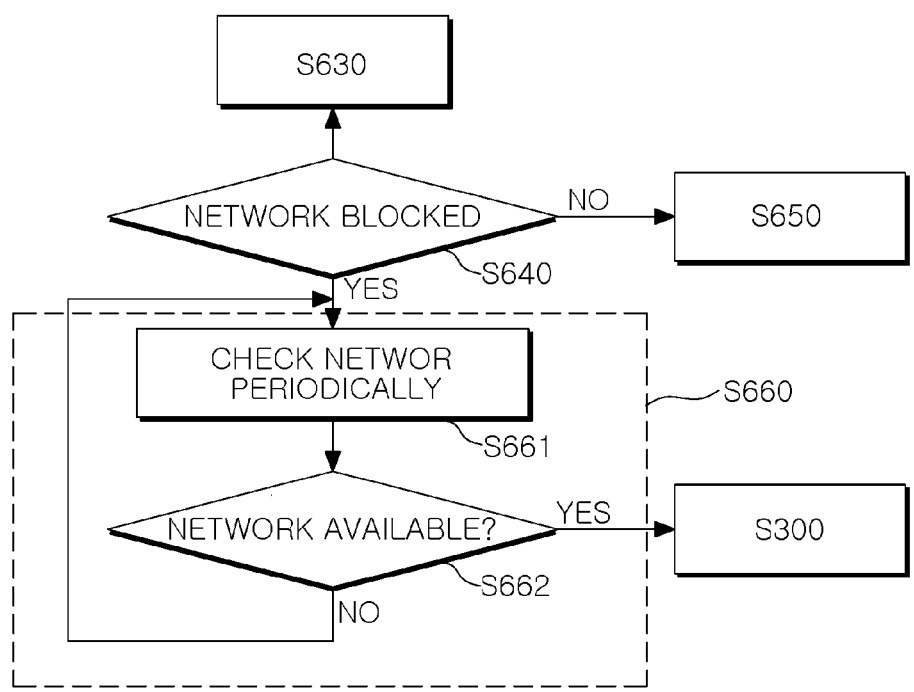
FIG. 8 is a flow chart illustrating a process of periodically checking a network according to another embodiment of the present invention.

FIG. 8 is a flow chart illustrating a process of periodically checking a network according to another embodiment of the present invention.

With reference FIGS. 1 through 8, step S660 of periodically checking a network may include step (S661) of periodically checking whether or not the blocked network is available again when it is determined that the network has been blocked in the network blocking determination step S640, and step (S662) of returning to the data division ratio adjustment step S630 when it is determined that the network is available again.

In this case, when it is determined that the network has been blocked in the network blocking determination step S640, whether or not the blocked network is available again may be periodically checked in step S661.

When it is determined that the blocked network is available again, the process may be returned to the data division ratio adjustment step S630 in step S661.

As described above, in an embodiment of the present invention, when data is appropriately divided based on a data rate by appropriately utilizing the cellular network and the Wi-Fi network, the effect of MIMO can be achieved. Thus, traffic in the communications apparatus to which the present invention is applied can be effectively dispersed and a user fee can be relatively reduced in comparison to the use of a single network which is charged.

As set forth above, according to embodiments of the invention, the communications apparatus and method for dispersing traffic can be applied to a cellular terminal such as a mobile phone, or the like, and can effectively disperse traffic by using both a cellular network and a Wi-Fi network, heterogeneous networks.

Namely, since the effect of multiple input multiple output (MIMO) can be achieved by appropriately dividing data based on a data rate by appropriately utilizing a cellular network and a Wi-Fi network, traffic in the communications apparatus to which the present invention applied can be effectively dispersed and a user fee can be relatively reduced in comparison to the use of a single network which is charged.

While the present invention has been shown and described in connection with the embodiments, it will be apparent to those skilled in the art that modifications and variations can be made without departing from the spirit and scope of the invention as defined by the appended claims.

What is claimed is:

1. A communications apparatus comprising:
   a cellular communication unit performing pre-set cellular communication;
   a Wi-Fi communication unit performing pre-set Wi-Fi communication; and
   a controller checking an available data rate of an available cellular network and that of a Wi-Fi network to determine a data division ratio by using the cellular communication unit and the Wi-Fi communication unit, obtaining an IP address pair, and transferring data including connection request information, the data division ratio for traffic dispersion, and the IP address pair to the server, according to a connection request from the server.

2. The communications apparatus of claim 1, wherein the cellular communication unit comprises:
   a cellular data processing unit converting data to be transmitted into a signal in conformity with a pre-set cellular communication protocol and converting a received signal into data in conformity with a pre-set cellular communication protocol; and
   a cellular transceiver unit converting a signal from the cellular data processing unit into a pre-set ratio signal and providing the converted radio signal to a first antenna, and converting a radio signal from the first antenna into a pre-set signal and providing the converted signal to the cellular data processing unit.

3. The communications apparatus of claim 1, wherein the Wi-Fi communication unit comprises:
   a Wi-Fi data processing unit converting data to be transmitted into a signal in conformity with a pre-set cellular communication protocol, and converting a received signal into data in conformity with a pre-set cellular communication protocol; and
   a Wi-Fi transceiver unit converting a signal from the Wi-Fi data processing unit into a pre-set radio signal and providing the converted radio signal to a second antenna, and converting a radio signal from the second antenna into a pre-set signal and providing the converted signal to the Wi-Fi data processing unit.

4. The communications apparatus of claim 1, wherein the controller checks an available cellular network and a Wi-Fi network by using the cellular communication unit and Wi-Fi communication unit according to the connection request from the server.

5. The communications apparatus of claim 4, wherein the controller checks a state and an available data rate of the checked cellular network and that of the Wi-Fi network.

6. The communications apparatus of claim 5, wherein the controller obtains an IP address of each of the available cellular network and the Wi-Fi network, and forms an IP address pair for traffic dispersion.

7. The communications apparatus of claim 5, wherein the controller determines a data division ratio according to the available data rates of the available cellular network and the Wi-Fi network.

8. The communications apparatus of claim 5, wherein the controller performs data communications with the server according to the data division ratio by using the cellular network and the Wi-Fi network corresponding to the previously registered IP address pair.

9. The communications apparatus of claim 8, wherein the controller checks data rates of the respective networks and adjusts a division ratio according to the checked data rates during data communications using the cellular network and the Wi-Fi network.

10. The communications apparatus of claim 9, wherein the controller continuously checks whether or not a block network is available again in case in which a network is blocked during data communications using the cellular network and the Wi-Fi network, and when it is determined that the block network is available, the controller adjusts the division ratio according to the data rate of the checked network.

11. A communication method comprising:
  checking, by a controller in cooperation with a cellular communication unit and a Wi-Fi communication unit of a communication apparatus, an available cellular network and an available Wi-Fi network according to a connection request from a server;
  checking an available data rate of the checked cellular network and that of the Wi-Fi network;
  determining a data division ratio according to the available data rates, obtaining an IP address of each of the available cellular network and the Wi-Fi network, and forming an IP address pair; and
  transferring data, the data division ratio for traffic dispersion, and the IP address pair to the server.

12. The communication method of claim 11, further comprising performing data communications with the server according to the data division ratio by using the cellular network and the Wi-Fi network corresponding to the previously registered IP address pair.

13. The communication method of claim 12, wherein, in the performing of data communication, a state of each network is monitored and the division ratio is adjusted during data communications using the cellular network and the Wi-Fi network.

14. The communication method of claim 11, wherein, in the checking of an available data rate, the state of the checked cellular network and the Wi-Fi network are further checked.

15. The communication method of claim 12, wherein the performing of data communications comprises:
  performing data transmission and reception using the cellular network and the Wi-Fi network;
  transmitting and receiving an ACK signal and a NACK signal generated during the data transmission and reception;
  adjusting a data division ratio according to the ACK signal and the NACK signal;
  determining whether or not a network has been blocked based on the ACK signal and the NACK signal;
  determining whether to select communication termination when a network has not been blocked, returning to the data transmission and reception operation when communications termination is not selected, and terminating the communication when the communication termination is selected; and
  periodically checking a blocked network when the network has been blocked.

16. The communication method of claim 15, wherein the periodically checking a network comprises:
  periodically checking whether or not the blocked network is available again when it is determined that the network has been blocked in the network blocking determination operation; and
  returning to the data division ratio adjustment operation when it is determined that the network is available again.

* * * * *